United States Patent
Albert et al.

(10) Patent No.: US 8,075,246 B2
(45) Date of Patent: Dec. 13, 2011

(54) RELIEF DEVICE FOR A TURBOJET AND A TURBOJET COMPRISING SAME

(75) Inventors: Brice Bruno Albert, Cugnaux (FR); Francois Marie Paul Marlin, Villiers Sous Grez (FR); Regis Eugene Henri Servant, Vigneux sur Seine (FR)

(73) Assignee: Snecma, Paris (FR)

( * ) Notice: Subject to any disclaimer, the term of this patent is extended or adjusted under 35 U.S.C. 154(b) by 976 days.

(21) Appl. No.: 12/028,994

(22) Filed: Feb. 11, 2008

(65) Prior Publication Data

US 2008/0193279 A1 Aug. 14, 2008

(30) Foreign Application Priority Data

Feb. 12, 2007 (FR) ...................................... 07 01000

(51) Int. Cl.
*F02K 3/02* (2006.01)
*F01D 17/14* (2006.01)
(52) U.S. Cl. ........... 415/39; 415/116; 415/127; 415/145
(58) Field of Classification Search ................ 415/39, 415/115, 116, 127, 145, 157, 167, 169.1
See application file for complete search history.

(56) References Cited

U.S. PATENT DOCUMENTS

| | | | |
|---|---|---|---|
| 5,279,109 A | | 1/1994 | Liu et al. |
| 6,092,987 A | * | 7/2000 | Honda et al. ................ 415/145 |
| 6,622,475 B2 | * | 9/2003 | Brault et al. ................ 60/226.3 |
| 6,938,407 B2 | * | 9/2005 | Beutin et al. ................ 60/226.1 |
| 7,249,929 B2 | * | 7/2007 | Cummings et al. ........... 415/144 |

FOREIGN PATENT DOCUMENTS

| | | |
|---|---|---|
| EP | 0 174 255 A1 | 3/1986 |
| EP | 0 511 770 A1 | 11/1992 |
| EP | 1 249 618 A1 | 10/2002 |
| EP | 1 308 601 A1 | 5/2003 |
| EP | 1 531 236 A2 | 5/2005 |

\* cited by examiner

*Primary Examiner* — Edward Look
*Assistant Examiner* — Liam McDowell
(74) *Attorney, Agent, or Firm* — Oblon, Spivak, McClelland, Maier & Neustadt, L.L.P.

(57) ABSTRACT

The relief device is designed to divert a portion of a main flow toward a by-pass flow in a turbojet that includes a main flow stream, a by-pass flow stream and an intermediate casing. The relief device includes inner openings of the inner shroud, outer openings of the outer shroud, a relief circuit connecting the inner openings to the outer openings, and a blanking device capable of opening and closing the relief circuit. The relief circuit includes upstream holes of the intermediate casing, downstream holes of the intermediate casing, and an annular channel defined between the intermediate casing, the outer shroud and a connecting partition. The connecting partition rests on the intermediate casing so as to encompass the downstream holes of the intermediate casing in the annular channel and resting on the outer shroud so as to encompass the outer openings of the outer shroud in the annular channel.

13 Claims, 5 Drawing Sheets

RELIEF DEVICE FOR A TURBOJET AND A TURBOJET COMPRISING SAME

BACKGROUND OF THE INVENTION

The present invention relates to the field of turbofan aircraft engines.

It relates more precisely to a relief device for a turbojet and to a turbojet fitted with such a relief device.

In a known manner, an aircraft turbofan engine comprises a main stream of gas flow and a by-pass stream of gas flow that are separated by an intermediate casing that is a structural part. In the main stream are placed, from upstream to downstream in the direction of flow of the gases, a low-pressure compressor and a high-pressure compressor. The air thus compressed is carried to a combustion chamber in which it is mixed with the pressurized fuel that is burnt to supply, downstream of the combustion chamber, energy to a high-pressure turbine that drives the high-pressure compressor, then to a low-pressure turbine that drives the fan and the low-pressure compressor. The gases leaving the turbines supply a residual thrust that is added to the thrust generated by the gases traveling in the by-pass stream in order to provide the propulsion of the aircraft.

In certain flight conditions, the quantity of air delivered by the low-pressure compressor is too great to ensure correct operation of the turbojet, so it is necessary to divert a portion of this air toward the by-pass stream in order to prevent the occurrence of the phenomenon called pumping that is due to the separation of fluid wisps along the blades and causes an instability of the flow.

The air diversion is also called air relief. It is carried out by means of a relief device.

DESCRIPTION OF THE PRIOR ART

A well-known relief device uses movable flaps that are articulated and actuated simultaneously by a set of actuation means. Such a flap relief device is described in document U.S. Pat. No. 3,638,428. An example of a flap relief device is shown in FIG. 10, which illustrates the main flow stream 110 in which the low-pressure compressor 112 is placed and the by-pass flow stream 114 that surrounds the main flow stream 110. The two streams 110, 114 are annular and are separated by an interstream compartment 117 shown in the form of an annular compartment having an inner shroud 116 and an outer shroud 118. An intermediate casing 120 that is a structural part extends over one section of the turbojet and connects the inner shroud 116 and the outer shroud 118. The intermediate casing 120 comprises support arms 122 that extend radially from the outer shroud 118 to the inside of the by-pass stream 114. These support arms 122 allow the forces of the engine to pass to the structure of the aircraft. They are usually eight to twelve in number.

Upstream of the support arms 122, the inner stream 114 also contains contravanes 124 which extend radially from the outer shroud 118 and have the function of rectifying the flow of air after it has passed through the blades of a fan (not shown in the figure).

The flow in the main stream 110 is represented by the arrows 190. The flow in the by-pass stream 114 is represented by the arrows 192. The air relief or diversion from the main stream 110 to the by-pass stream 114 is shown by the arrows 194. This relief takes place through inner openings 126 of the inner shroud 116 and outer openings 128 of the outer shroud 118, by means of movable flaps 130 placed in the interstream compartment 117, between the inner shroud 116 and the outer shroud 118. The movable flaps 130 are actuated by cylinders 164 so as to be able to blank off the inner openings 126 in a synchronous manner. The outer openings 128 are not blanked off. They have the form of grilles distributed over the circumference of the outer shroud 118 and positioned at the intermediate casing between the support arms 122.

SUMMARY OF THE INVENTION

The relief device of the prior art that has just been described with reference to FIG. 10 is not suitable for recent aviation turbojet designs which are increasingly tending to reduce the weight and space requirement of the turbojets. Accordingly an effort is being made to shorten the axial dimension of turbojets, and it has been proposed to place the contravanes on the same axial section of the intermediate casing as the support arms, and even to give these support arms a stator profile. For example, on the intermediate casing, there are support arms between which the countervanes are distributed. Consequently there is no more room on this section to place the outer opening grilles necessary for relief. In addition, even if it were possible to clear positions to place such relief grilles, another disadvantage would be of concern. Specifically, the main flow (arrows 190) often contains debris such as ice particles. If they are in the relief flow (arrows 194), this debris is likely to damage the countervanes placed between the support arms, because these countervanes are usually made of composite material or aluminum.

The object of the invention is to remedy the disadvantages explained above. It proposes a relief device making it possible to provide an air diversion or relief from the main stream to the by-pass stream that is suitable for a turbojet design in which the countervanes are positioned on the same section as the support arms.

According to a first aspect, the invention relates to a relief device designed to divert a portion of a main flow toward a by-pass flow in a turbojet, said turbojet having a main flow stream and a by-pass flow stream between which there is an interstream compartment having an inner shroud separating it from said main stream and an outer shroud separating it from said by-pass stream, said turbojet having an intermediate casing furnished with an upstream wall and a downstream wall, the relief device comprises:
- inner openings of the inner shroud, positioned upstream of the intermediate casing,
- outer openings of the outer shroud, positioned downstream of the intermediate casing,
- a relief circuit connecting said inner openings to said outer openings through the interstream compartment,
- blanking means capable of opening and closing said relief circuit and wherein the relief circuit comprises:
- upstream holes of the intermediate casing,
- downstream holes of the intermediate casing,
- an annular channel defined between the intermediate casing, the outer shroud and a connecting partition, said connecting partition resting on the intermediate casing so as to encompass the downstream holes of the latter in said annular channel and resting on the outer shroud so as to encompass the outer openings of the latter in said annular channel.

According to the invention, the upstream holes of the intermediate casing are made through an upstream wall of the latter and the downstream holes of the intermediate casing are made through a downstream wall of the latter.

According to the invention, the relief device comprises a manifold placed upstream of the intermediate casing and comprising relief passageways placing the inner openings of the inner shroud in communication with the upstream holes of the intermediate casing.

According to an optional variant embodiment, the relief circuit comprises as many upstream holes as downstream holes, and it also comprises guide tubes installed between the upstream wall and the downstream wall of the intermediate casing, each guide tube connecting an upstream hole with a downstream hole opposite.

The blanking means comprise a relief ring furnished with relief apertures and placed upstream of the intermediate casing. Said relief ring is capable of moving in axial rotation between an open position of the relief circuit in which said relief apertures coincide at least partially with passageways of the relief circuit, and a closed position of the relief circuit in which said relief apertures do not at all coincide with said passageways of the relief circuit.

In the completely open position of the relief circuit, each relief aperture of the relief ring is completely superposed with a relief passageway of the manifold. In a partially open position of the relief circuit, each relief aperture of the relief ring is partially superposed with a relief passageway of the manifold. In the completely closed position of the relief circuit, no relief aperture of the relief ring is superposed with a portion of a relief passageway of the manifold.

The blanking means comprise means for actuating said relief ring in order to command a movement of the latter between said completely open and completely closed positions of the relief circuit.

The actuation means comprise at least one guide slot cut into the upstream wall of the intermediate casing, in a circumferential direction.

The actuation means comprise at least one shaft for controlling the relief ring. The travel of the latter is limited by the ends of said guide slot.

The actuation means comprise at least one cylinder associated with said control shaft and placed inside the interstream compartment between the upstream wall and the downstream wall of the intermediate casing.

According to a second aspect, the invention relates to a turbojet comprising a relief device according to the first aspect.

BRIEF DESCRIPTION OF THE DRAWINGS

The invention will be better understood on reading the following detailed description of a particular embodiment of the invention, provided as an indication and in no way limiting, and illustrated by means of the appended drawings, in which.

DESCRIPTION OF THE PREFERRED EMBODIMENTS

In everything that follows, the terms "radial", "axial" and "circumferential" refer to the "radial", "axial" and "circumferential" directions of the turbojet and the terms "upstream" and "downstream" refer to the direction of flow of the gases in the turbojet.

Figure 1:
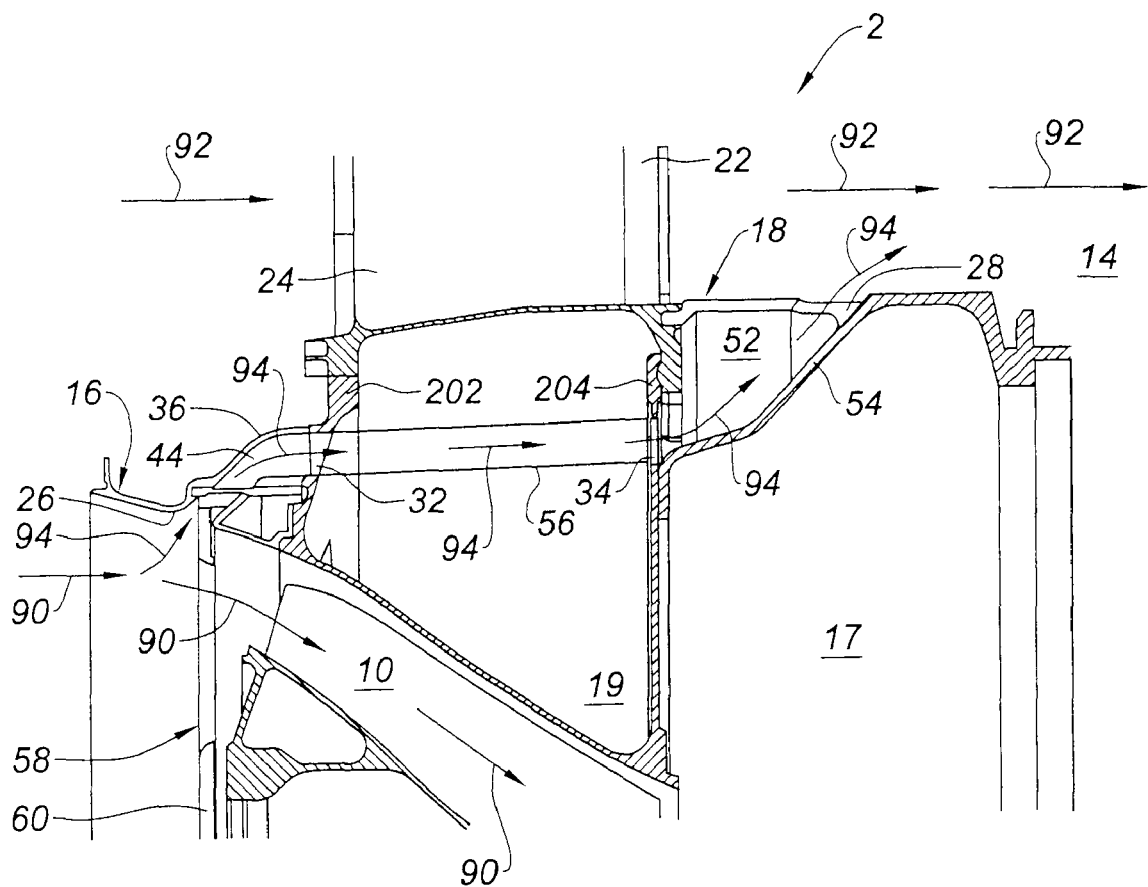
FIG. 1 illustrates, in axial section, the relief device according to the invention.

With reference first of all to FIG. 1, it represents, in axial section, a portion of a turbojet 2 centered on a portion of the intermediate casing 20, and showing the main stream 10 in which the main flow travels, indicated by the arrows 90, and the by-pass stream 14 in which the by-pass flow travels, indicated by the arrows 92. The intermediate casing comprises an upstream wall 202 and a downstream wall 204. It also comprises support arms 22 that extend radially in the by-pass stream 14 from the outer shroud 18 and are attached to the upstream wall 202 and to the downstream wall 204. It also comprises countervanes 24 that extend radially in the by-pass stream 14 from the outer shroud 18. They are distributed between the support arms 22 and are attached to the upstream wall 202 and downstream wall 204 of the intermediate casing 20. Between the main stream 10 and the by-pass stream 14 there is an interstream compartment 17 that is separated from the main stream by an inner shroud 16 and from the by-pass stream by an outer shroud 18. In particular, the interstream compartment 17 comprises an intermediate portion called the interstream cavity 19 delimited by the outer shroud 18, the inner shroud 16, the upstream wall 202 of the intermediate casing 20 and the downstream wall 204 of the intermediate casing 20.

The relief flow from the main stream 10 to the by-pass stream 14 is identified by the arrows 94. It leaves the main stream 10 through inner openings 26 of the inner shroud 16 and enters the by-pass stream 14 through outer openings 28 of the outer shroud 18. It passes through upstream holes 32 of the upstream wall 202 and downstream holes 34 of the downstream wall 204.

Figure 5:
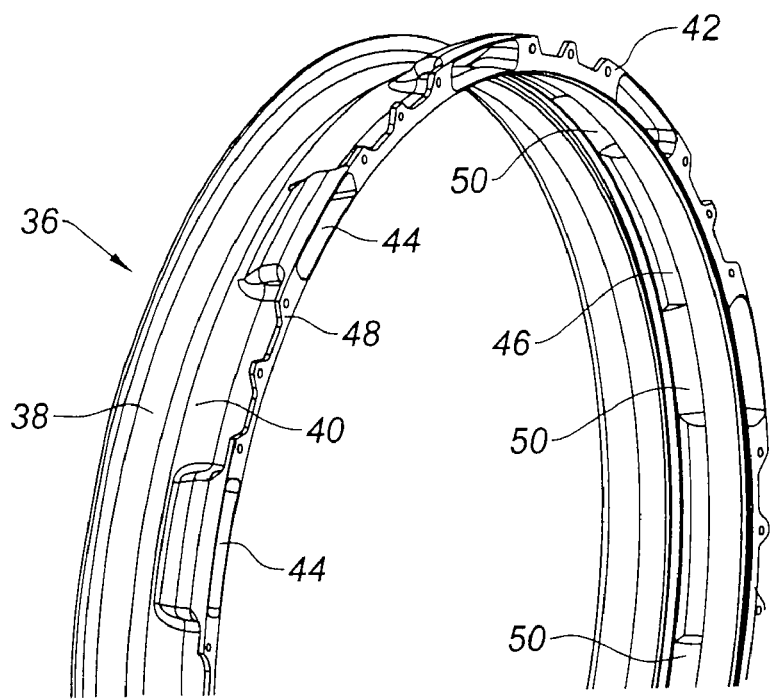
FIG. 5 is a rear view in perspective of the manifold.

Between the inner openings 26 and the upstream holes 32 of the intermediate casing 20, the relief flow 94 is guided by a manifold 36. This manifold 36 is represented in rear perspective in FIG. 5. It is an annular part having an upstream zone 38 and a downstream zone 40. The upstream zone 38 is an annular zone which extends in the extension of the inner shroud 16. The downstream zone 40 comprises a fastening flange 42 for it to be fastened to the upstream wall 202 of the intermediate casing 20. The manifold 36 comprises, on its downstream zone 40, relief passageways 44 identical in number to the number of upstream holes 32 of the upstream wall 202. In the example illustrated, the relief passageways 44 are ten in number. They extend from an inner face 46 to a downstream face 48 of the downstream zone 40, said downstream face 48 being the face of contact between the fastening flange 42 and the intermediate casing 20 when the manifold 36 is fastened to the latter. They open onto said inner face 46 through inner orifices 50.

Between the downstream holes 34 of the intermediate casing 20 and the outer openings 28, the relief flow 94 is guided by an annular channel 52. The latter is delimited by the downstream wall 204 of the intermediate casing 20, the outer shroud 18 downstream of the intermediate casing 20, and a connecting partition 54 that links said outer shroud 18 to said downstream wall 204 so as to encompass the outer openings 28 and the downstream holes 34 in said annular channel 52.

According to an optional variant embodiment, that is illustrated in the figures, the relief flow 94 is guided, between the upstream holes 32 and the downstream holes 34 of the intermediate casing 20, by guide tubes 56 that extend substantially in an axial direction through the interstream cavity 19 of the interstream compartment 17 situated between the upstream wall 202 and downstream wall 204 of the intermediate casing 20. When the guide tubes 56 are provided, preferably the same number of upstream holes 32 and downstream holes 34 are provided. In the example illustrated, they are ten in number. These guide tubes 56 have the advantage of completely guiding the relief flow 94, which otherwise would fill the interstream cavity 19 of the interstream compartment 17 between the upstream wall 202 and the downstream wall 204 of the intermediate casing 20, with the risk of depositing in this interstream cavity 19 debris such as for example fragments of ice or sand.

The manifold 36, the upstream holes 32, the downstream holes 34, the annular channel 52 and the guide tubes 56, when they are present, define a relief circuit 36, 32, 56, 34, 52 between the inner openings 26 of the inner shroud 16 and the outer openings 28 of the outer shroud 18.

The relief device according to the invention comprises said inner openings 26, said outer openings 28 and said relief circuit. It also comprises blanking means 58, 60, 62, 64, 66 of said relief circuit.

Figure 4:
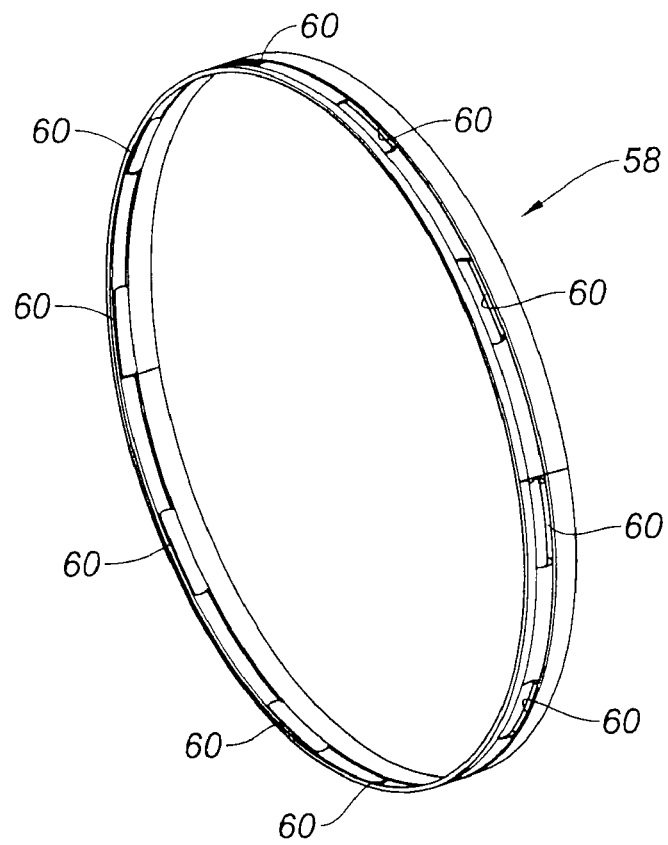
FIG. 4 is a front view in perspective of the relief ring.

These blanking means 58, 60, 62, 64, 66 comprise a relief ring 58, represented in front perspective in FIG. 4. This relief ring 58 comprises relief apertures 60 of which the number, shape and dimensions match the number, shape and dimensions of the inner orifices 50 of the manifold 36. They are ten in number in the example illustrated.

In service, the relief ring 58 is centered on the inner face 46 of the manifold 36 so as to be able to rotate relative to the latter between two extreme positions. More precisely, the relief ring 58 is shown against the inner face 46 of the downstream zone 40 of the manifold 36, and is guided in rotation by this inner face 46.

Figures 6, 7, 8:
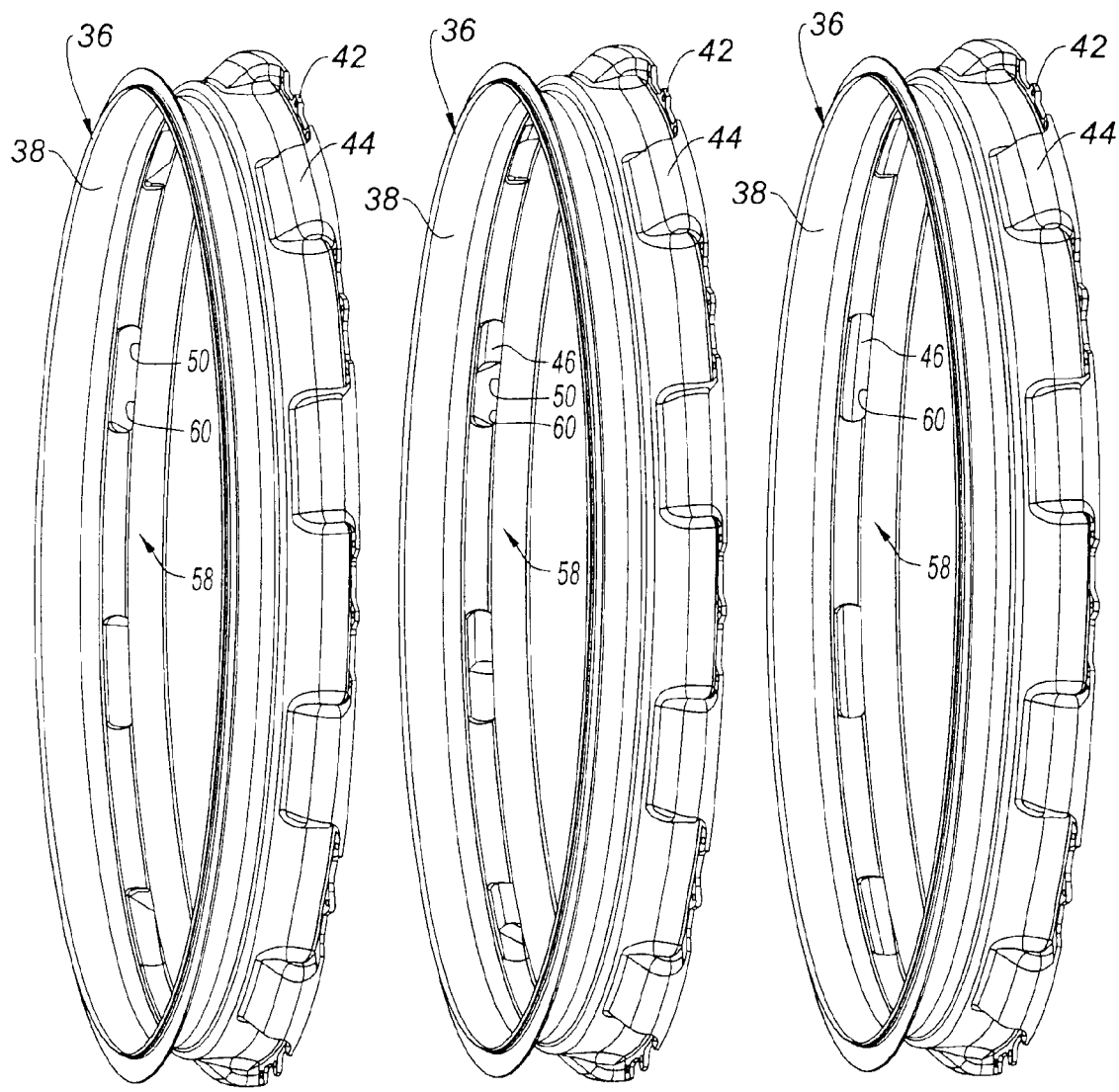
FIGS. 6, 7 and 8 represent in front perspective the assembly formed by the manifold and the relief ring, when the relief circuit is respectively completely open, partially open and completely closed.

The extreme positions, and a partially open intermediate position, are illustrated in FIGS. 6 to 8. Therefore:

FIG. 6 is a view in perspective of the relief ring 58 assembled with the manifold 36 in the completely open position of the relief circuit, in which the relief ring 58 is rotated so that its relief apertures 60 are exactly superposed with the inner orifices 50 of the relief passageways 44 of the manifold 36;

FIG. 7 is a view in perspective of the relief ring 58 assembled with the manifold 36 in a partially open—or partially closed—position of the relief circuit, in which the relief ring 58 is rotated so that its relief apertures 60 partially blank off the inner orifices 50 of the relief passageways 44 of the manifold 36 and partially cover the inner face 46 of the latter;

FIG. 8 is a view in perspective of the relief ring 58 assembled with the manifold 36 in the completely closed position of the relief circuit, in which the relief ring 58 is rotated so that its relief apertures 60 are not superposed with the inner orifices 50 of the relief passageways 44 of the manifold 36, but with the inner face 46 of the latter.

Figure 9:
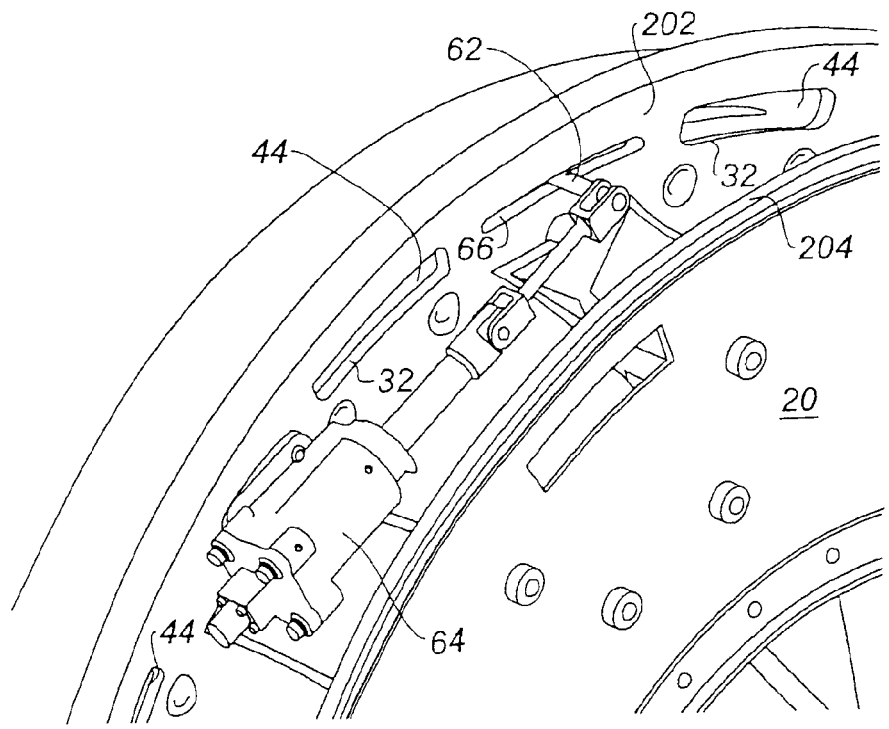
FIG. 9 illustrates a view in perspective showing the means for actuating the relief ring.
Figure 10:
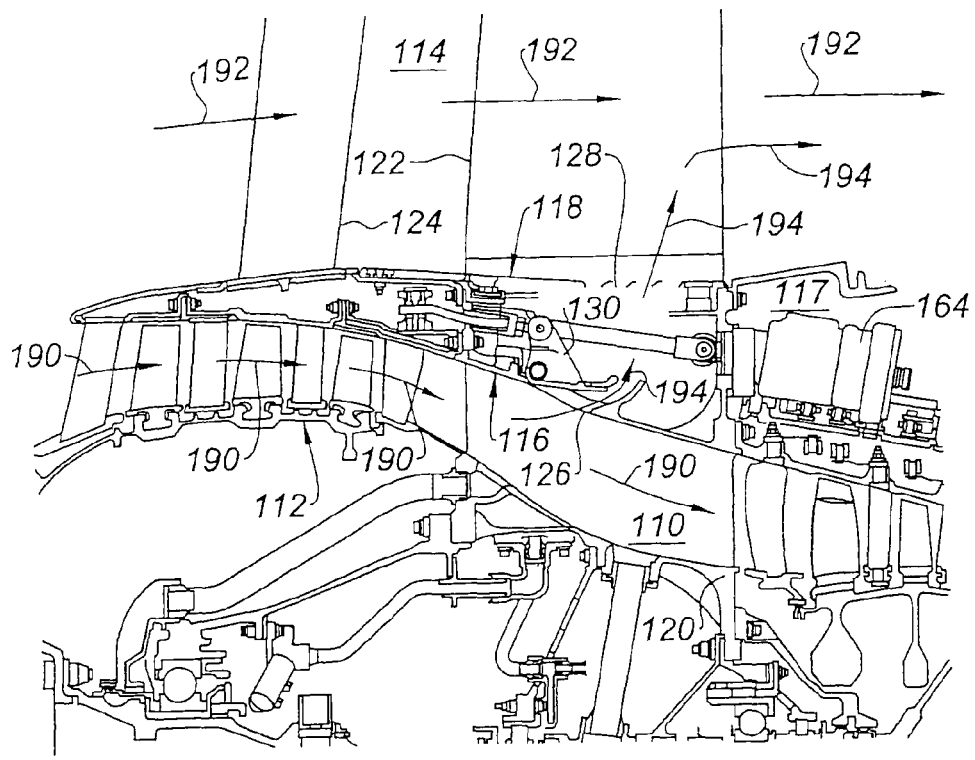
FIG. 10, already described, is a view in axial section of a relief device of the prior art.

The blanking means 58, 60, 62, 64, 66 also comprise means 62, 64, 66, that are illustrated in FIG. 9, for actuating the relief ring 58.

In the exemplary embodiment illustrated in the figures, the relief ring 58 is furnished with at least one control shaft 62 that extends in a substantially axial direction from the relief ring 58. Preferably, the relief ring 58 is furnished with two control shafts 62. Such control shafts 62 are placed between the apertures 60 of the relief ring 58. Each control shaft 62 is connected to a cylinder 64 that is placed either in the interstream cavity 19 between the upstream wall 202 and the downstream wall 204 of the intermediate casing 20, or in the interstream compartment 17. Accordingly, each control shaft 62 passes through the upstream wall 202 of the intermediate casing 20. More precisely, each control shaft 62 passes through a guide aperture 66 cut into this upstream wall 202, between two upstream holes 32. The ends of each guide aperture 66 perform a stop function for the control shaft 62 that passes through it. The travel of the control shaft 62 is limited by the ends of the guide aperture 66. The latter is appropriately dimensioned so that the travel of the control shaft 62 allows the relief ring 58 to move between the two desired extreme positions of the relief circuit. Therefore, one of the stops of the control shaft 62 corresponds to the completely open position of the relief ring 58, while the other stop of the control shaft corresponds to the completely closed position of the relief ring 58.

Figure 3:
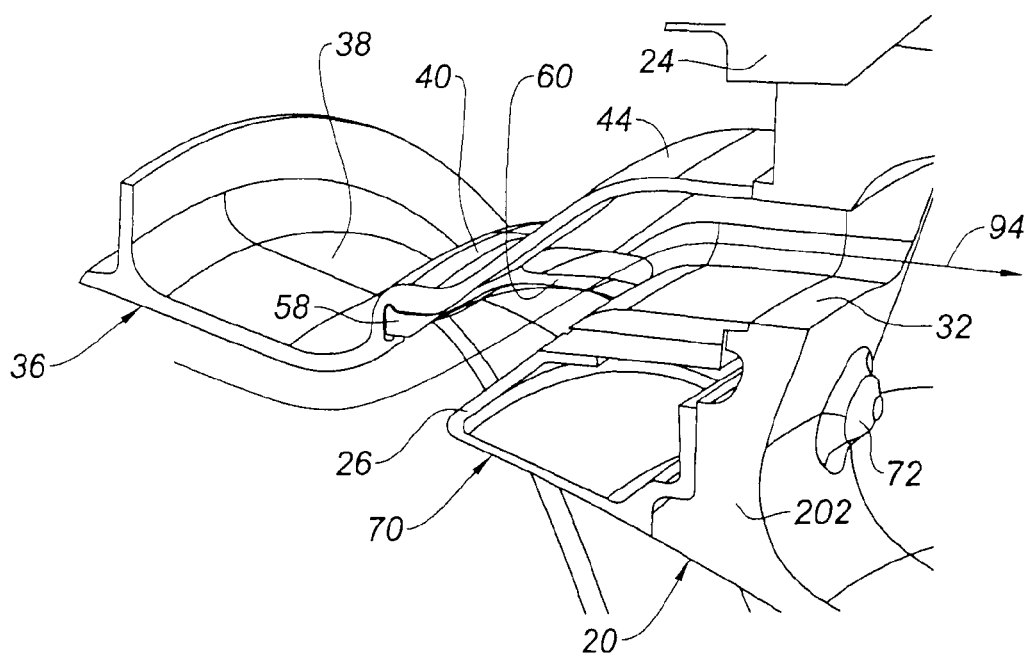
FIG. 3 is another view in perspective, on a larger scale, of the relief device cut along a longitudinal plane, showing more particularly the assembly of the relief ring with the manifold.

FIG. 3 is a view in perspective and in section through the relief circuit. It represents the manifold 36 fastened to the upstream wall 202 of the intermediate casing 20 and the relief ring 58 and the manifold 36 assembled in the completely open position of the relief circuit. It shows, in section, an inner opening 26, a relief passageway 44 and an upstream hole 32. In this figure, it appears that the inner shroud 16 of the interstream compartment 17 is materialized, at this level of the turbojet, by an upstream zone 38 of the manifold 36, then by a spoiler 70, then by the intermediate casing 20. The spoiler 70 is an annular connecting part fastened to the upstream wall 202 of the intermediate casing 20 by fastening means 72, for example screws, and on which the relief ring 58 is centered. For simplification reasons, the guide tubes 56 are not shown in FIG. 3.

Figure 2:
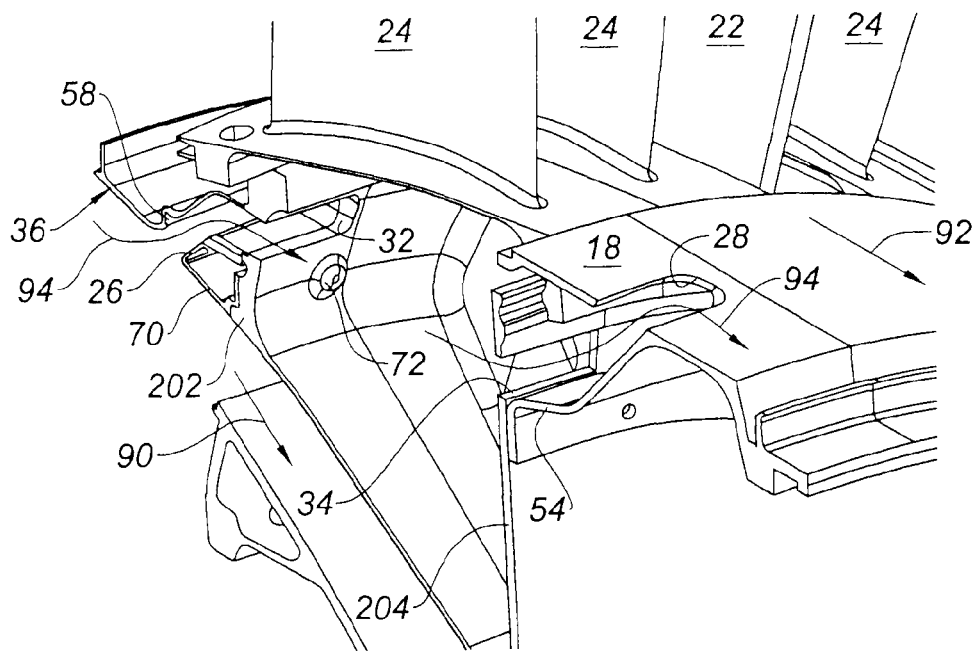
FIG. 2 is a view in perspective of the relief device cut along a longitudinal plane.

FIG. 2 is another view in perspective, at a greater distance, and in section through the relief circuit. It represents the manifold 36 fastened to the upstream wall 202 of the intermediate casing 20. This figure also shows, in section, a downstream hole 34 of the downstream wall 204 of the intermediate casing 20 and an outer opening 26 of the outer shroud 18, and the annular channel 52. The latter is delimited by the outer shroud 18, the downstream wall 204 of the intermediate casing 20 and a connecting partition 54. In addition, FIG. 2 shows countervanes 24 and a support arm 22 fastened to the upstream wall 202 and downstream wall 204 of the inner casing 20. For simplification reasons, the guide tubes 56 are not shown in FIG. 2.

The invention claimed is:

1. A relief device designed to divert a portion of a main flow toward a by-pass flow in a turbojet, comprising:
   a main flow stream, a by-pass flow stream and an interstream compartment provided between the main flow stream and the by-pass flow stream, said interstream compartment including an inner shroud separating said interstream compartment from said main flow stream and an outer shroud separating said interstream compartment from said by-pass flow stream;
   an intermediate casing furnished with an upstream wall and a downstream wall;
   inner openings of the inner shroud, positioned upstream of the intermediate casing;
   outer openings of the outer shroud, positioned downstream of the intermediate casing;
   a relief circuit connecting said inner openings to said outer openings through the interstream compartment, said relief circuit including, arranged upstream to downstream, a manifold, upstream holes provided in said upstream wall of said intermediate casing, downstream holes provided in said downstream wall of said intermediate casing, and an annular channel defined between said downstream wall of said intermediate casing, said outer shroud and a connecting partition which rests on said intermediate casing so as to encompass said downstream holes provided in said downstream wall and which rests on said outer shroud so as to encompass said outer openings provided in said outer shroud; and a relief ring disposed upstream of said intermediate casing and provided with relief apertures, wherein said manifold is an annular part with relief passageways extending from inner orifices provided on an inner face of said manifold to outlet orifices provided on a downstream face of said manifold in fluid communication with said upstream holes provided in said upstream wall of said intermediate casing, said inner orifices are in fluid communication with said inner openings, and wherein said relief ring moves in axial rotation between an open position of said relief circuit in which said relief apertures coincide at least partially with said inner orifices of said manifold, and a closed position of said relief circuit in which said relief apertures do not at all coincide with said inner orifices of said manifold.

2. The relief device as claimed in claim 1, wherein said relief circuit comprises as many upstream holes as downstream holes and wherein said relief circuit further comprises guide tubes installed between the upstream wall and the downstream wall of the intermediate casing, each guide tube connecting an upstream hole with a corresponding downstream hole.

3. The relief device as claimed in claim 1, wherein, in a completely open position of the relief circuit, each relief aperture of the relief ring is completely superposed with a relief passageway of the manifold.

4. The relief device as claimed in claim 1, wherein, in a partially open position of the relief circuit, each relief aperture of the relief ring is partially superposed with a relief passageway of the manifold.

5. The relief device as claimed in claim 1, wherein, in a completely closed position of the relief circuit, no relief aperture of the relief ring is superposed with a portion of a relief passageway of the manifold.

6. The relief device as claimed in claim 1, further comprising means for actuating said relief ring in order to command a movement of the relief ring between completely open and completely closed positions of the relief circuit.

7. The relief device as claimed in claim 6, wherein said actuation means comprise at least one guide aperture cut into the upstream wall of the intermediate casing, in a circumferential direction.

8. The relief device as claimed in claim 7, wherein said actuation means comprise at least one shaft for controlling the relief ring.

9. The relief device as claimed in claims 8, wherein the travel of said control shaft is limited by ends of said guide aperture.

10. The relief device as claimed in claim 9, wherein said actuation means comprise at least one cylinder associated with said control shaft and placed inside the interstream compartment between the upstream wall and the downstream wall of the intermediate casing.

11. A turbojet comprising a relief device as claimed in claim 1.

12. The relief device as claimed in claim 1, wherein each of the relief passageways includes a radial flow portion beginning at the inner orifice provided on the inner face of said manifold, an axial flow portion terminating at the outlet orifice provided on the downstream face of said manifold, and a transition portion between the radial flow portion and the axial flow portion.

13. The relief device as claimed in claim 1, wherein the downstream face of said manifold abuts said upstream wall of said intermediate casing.

* * * * *